Nov. 16, 1937.　　S. A. SCHERBATSKOY ET AL　　2,099,536
METHOD AND APPARATUS FOR SEISMIC PROSPECTING
Filed Feb. 27, 1937　　4 Sheets-Sheet 1
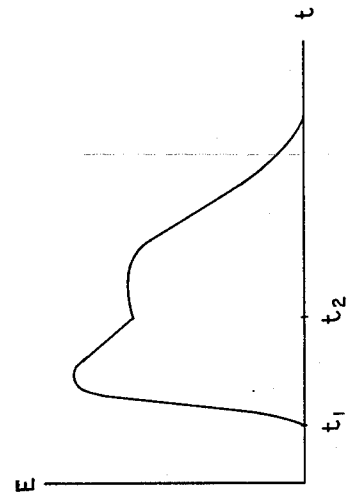
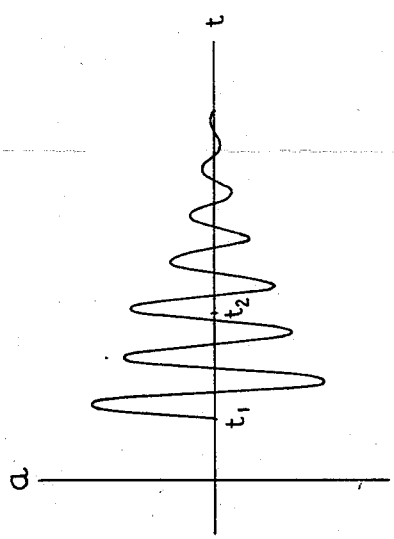
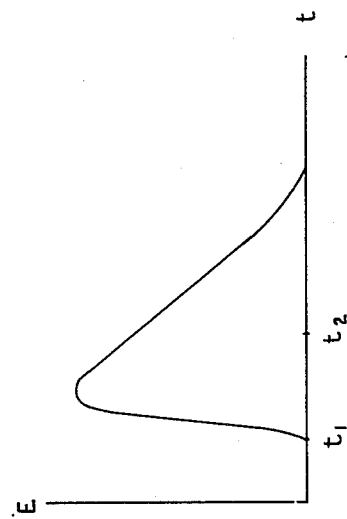
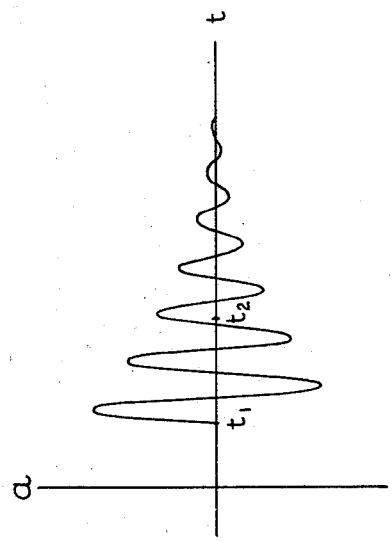
INVENTORS
Serge A. Scherbatskoy
Jacob Neufeld Nov. 16, 1937.    S. A. SCHERBATSKOY ET AL    2,099,536
METHOD AND APPARATUS FOR SEISMIC PROSPECTING
Filed Feb. 27, 1937    4 Sheets-Sheet 2

*Inventors.*
Serge A. Scherbatskoy
Jacob Neufeld

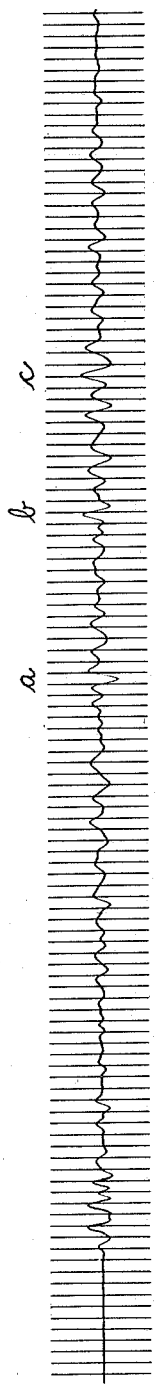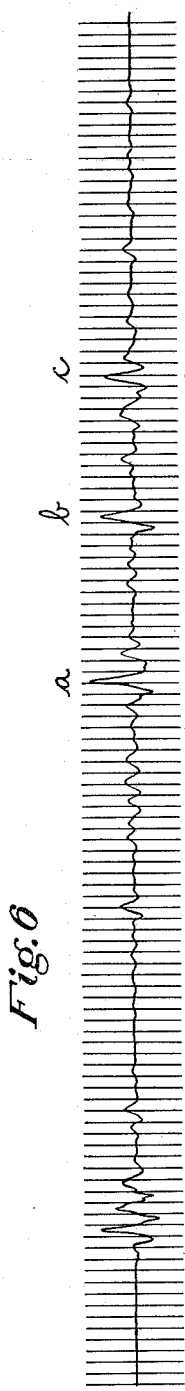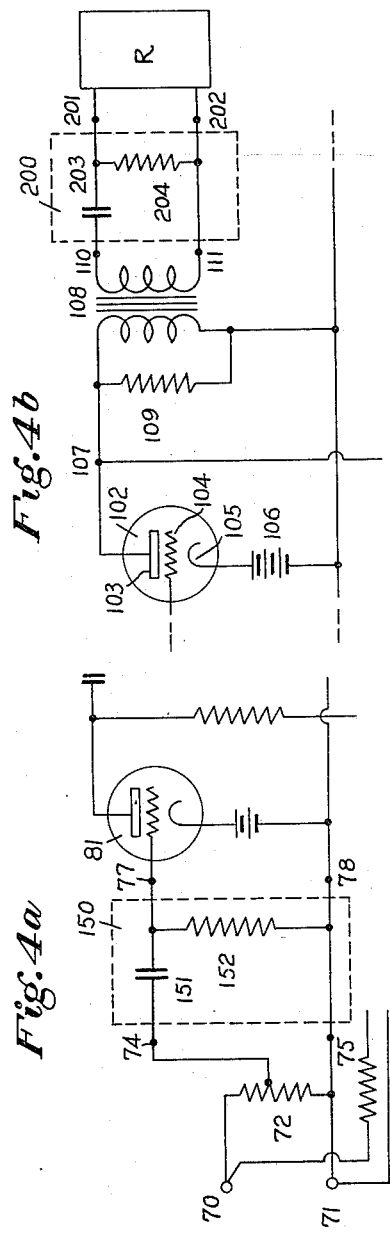

Patented Nov. 16, 1937

2,099,536

UNITED STATES PATENT OFFICE 2,099,536

METHOD AND APPARATUS FOR SEISMIC PROSPECTING

Serge Alexander Scherbatskoy and Jacob Neufeld, Tulsa, Okla., assignors to Engineering Laboratories, Inc., Tulsa, Okla., a corporation of Oklahoma Application February 27, 1937, Serial No. 128,264

64 Claims. (Cl. 181—0.5)

Our invention relates to seismic recording system and more particularly to systems used for seismological exploration and provides a new and improved method for receiving and recording seismic vibrations and the like.

Seismological exploration consists in surveying the geological structure of the subsurface and determining the depths and slopes of subsurface strata with a view towards locating formations favorable to the accumulation of oil and other valuable minerals.

One of the methods of determining the subsurface strata comprises creating earth vibrations by detonating an explosive at or near the surface of the earth and producing seismograms, i. e. graphical records of vibrations after they have been influenced by various geological strata and returned to the surface of the earth. In generating earth vibrations a great many oscillations are set up. Some of these vibrations are valuable in the art of seismological exploration while others have an interfering effect and obscure the seismograms and make the results difficult to interpret.

More specifically our invention relates to improvements in seismic methods of exploration wherein the waves reflected from certain geological strata differing in physical qualities from adjacent strata are utilized. This method is well known in the art under the name of "reflection seismic method".

The reflection seismic method comprises the determining of the time interval required for a seismic wave to travel from the point of origin of the disturbance down to the subsurface formation being surveyed and back to the surface of the earth after reflection from the subsurface formation. This time interval is determined by means of a seismogram which contains the initial signal coincident with the explosive detonation and a record of identifiable reflected waves which are usually partly masked and partly obscured by the interfering refracted, diffracted and direct waves. Due to the relative indeterminacy of the reflected waves considerable difficulty was experienced in the prior art in the proper interpretation of the seismographic records and in many instances it was not possible to indicate positively the time at which reflected waves arrived at the surface.

It is therefore the purpose of the present invention to eliminate the inconveniences of the prior art and to produce a novel method and means for producing seismographic records in which the determinacy of the reflection points will be considerably increased. Thus the calculations employing the interval of time between the detonation and the time of arrival of the reflected waves, are therefore accurate and it is possible to obtain substantially the exact depth of the subterranean beds at the points of reflection.

It is another purpose of our invention to provide an apparatus which may be effectively set to recognize and to reproduce in a visual form the energy relationships involved in the reception of seismic waves.

A further purpose of the invention is to improve the method of identifying waves caused by the reflected energy.

A further purpose of our invention is to provide a means for recording the energy content of an earth particle participating in the ground motion.

A further purpose of our invention is to provide a method and a means for translating the damped sinusoidal motion which characterizes seismic waves into a substantially steady motion.

A further purpose of our invention is to reduce the number of oscillations in a seismographic record and thus improve its clarity and legibility.

Further purposes appear in the specifications and in the claims.

Our invention involves both the structure and the method subjects matter.

In the drawings we are illustrating certain features involving the principle of our invention and are showing three embodiments thereof which have been chosen in view of their simplicity in operation and convenient illustration of the principles involved.

Figures 1a and 1b are intended to assist in the proper understanding of the invention. They contain diagrams representing graphically the effects caused by the dropping of a weight from an appropriate height upon the surface of the earth.

Figures 2a and 2b contain diagrams representing graphically the effects caused by the dropping of two weights separately, at two successive instants.

Figure 4a shows a modified fragment of Figure 4.

Figure 4b shows another modified fragment of Figure 4.

Figure 5 represents a seismographic record exhibiting some of the inconveniences of the prior art.

Figure 6 represents a seismographic record obtained by means of the present invention.

Like numerals refer to like parts.

Figure 3:
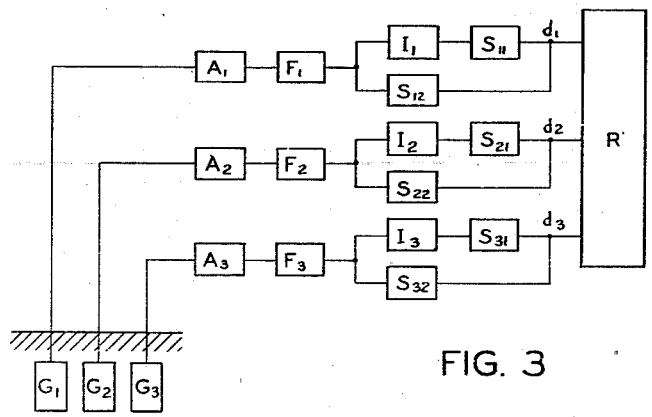
Figure 3 is a diagrammatic layout of a complete mechanism for practicing the invention and shows the arrangement and functions of its various constituents. In this figure electrical connections are for convenience indicated by single lines.

In order to explain certain features of the present invention reference is made to Figures 1a, 1b, 2a, 2b which reproduce under idealized conditions some aspects involved in the propagation of seismic waves.

Figures 1a, 1b represent the effect of dropping a weight from a certain height upon the earth at a given location and of recording the resulting earth motion at another location. Figures 2a, 2b represent the effect of dropping two weights at two successive instants and of recording the resulting earth motion at the referred locations.

The record of the motion of the earth in the first experiment is given in Figure 1a and Figure 1b. Figure 1a represents graphically the "displacement function" $a(t)$ of an earth particle in the wave motion. The ordinate $a$ represents the displacement of the earth particle from its neutral position and $t$ represents the time variable. The value $t_1$ corresponds to the instant at which the weight was dropped.

By inspecting Figure 1a it is observed that the surface of the earth when suddenly subjected to an impact caused by dropping a weight is set in an oscillatory motion roughly resembling a damped sinusoid.

During this oscillatory motion each earth particle possesses a certain amount of potential energy expressed by the formula:

$$\frac{1}{2}sa^2 \qquad (1)$$

($a \equiv a(t)$ represents the displacement of the particle from its neutral position at any instant $t$ and $s$ is the coefficient of elasticity; and a certain amount of kinetic energy expressed by the formula:

$$\frac{1}{2}m\left(\frac{da}{dt}\right)^2 \qquad (2)$$

$$\frac{da}{dt} \equiv \frac{da(t)}{dt}$$

represents the rate of change of the displacement with respect to the time or the velocity of the particle at any instant $t$ and $m$ is the mass of the particle.

Then the total energy $E(t)$ of the particle at any instant $t$ is expressed by the formula:

$$E(t) = \frac{1}{2}sa^2 + \frac{1}{2}m\left(\frac{da}{dt}\right)^2 \qquad (3)$$

During the oscillation of the referred earth particle the value of the energy $E(t)$ does not remain constant; part of it dissipates itself in the form of heat and part of it is continuously transmitted in the form of a wave to the neighboring particles to which it communicates the oscillatory motion. Thus upon receiving an initial impulse the energy of the earth particle rises suddenly to a certain value and after the impulse the energy slowly decays. Figure 1b illustrates qualitatively the energy decay of the particle. The ordinates E represent the energy and the abscissas $t$ represent time.

Consider now the earth motion caused by two separate and successive impulses, resulting from dropping a weight at the instant $t_1$ and from dropping an additional weight at another instant $t_2$. The results obtained are illustrated qualitatively in Figure 2a that representing the displacement $a$ of the earth particle at any instant $t$, and in Figure 2b that representing the energy E of the earth particle at any instant $t$.

Comparing Figure 1a with Figure 2a and Figure 1b with Figure 2b it is observed that the segments of the respective curves corresponding to the time interval between the instants $t_1$ and $t_2$ are substantially alike in character and after the instant $t_2$ a certain departure may be noticed between Figure 1a and Figure 2a and between Figure 1b and 2b respectively. It is observed that this departure is more noticeable between Figures 1b and 2b than between 1a and 2a and consequently the instant $t_2$ corresponding to the additional energy contribution is more determinate in Figure 2b than Figure 2a. In Figure 2a the function $E(t)$ changes its slope at the instant $t_2$ whereas in Figure 1b the oscillatory character of the curve is altered.

The two experiments described above approximate to some extent conditions occurring when an explosive is buried in the earth and subsequently detonated. At the instant of explosion a sudden impulse is generated and various unique and well known wave paths are created between the center of the explosion and the given locality at which the earth motion is recorded. Some of these paths are directed along the surface of the earth, the other paths go downward so that the impulse encounters a succession of simple strata at which it reflects or refracts itself and is returned to the surface of the earth. Thus the original impulse created by the explosion divides itself into a plurality of impulses which travel along different paths in form of wave trains having various velocities and arrive to the given locality one after another in succession and impress themselves on the recorder in form of a complex oscillatory motion.

Thus the motion of the earth at the referred point results from a superposition of several wave trains each of them bringing its own energy contribution to the recorder. Since the effect of each impulse is somewhat analogous to the effect of dropping the weight, the effect resulting from producing the explosion may be compared with the effect resulting from the successive dropping of several weights at several succeeding instants.

The analogy between the successive dropping of weights and the arrival of the successive wave trains caused by a dynamite detonation cannot be drawn so as to include all details. The inspection of Figures 1a, 1b, 2a, 2b, shows, however, that by studying the energy relationship rather than the actual motions it is easier to determine certain important instants at which the arrival of successive wave trains occur.

It should be noted that the purpose of geophysical seismological recording, as generally used, is not to study the actual ground motions but to determine certain instants at which the reflected waves arrive at the surface of the earth and cause certain changes in the ground motions. The method used in the prior art consisted in examining records of the actual ground motion and in deriving from them information concerning the occurrence of the reflection instants. The ground motion results from the superposition of two effects, one of which is caused by reflected waves and the other resulting from the previous contributions due to direct, refracted waves and to the natural oscillations of the earth. The proper interpretation of the records consists in identifying the reflected waves which are partly masked, and covered up by other waves. Since all of the component waves produce oscillatory motions which are generally alike in character it is extremely difficult to separate the waves on the record.

We are therefore introducing a new method in the seismological geophysical prospecting art, and instead of actual ground motion we are recording the energy values caused by the arrival of seismic waves. It will be observed that in our method the various component waves do not impress themselves on the record in the form of oscillatory curves but produce steadily increasing or decreasing curves expressing the corresponding energy variations corresponding to the motion of the earth.

One of the methods for recording energies involved in the earth motion is represented schematically in Figure 3. Referring now more particularly to this figure, rectangular blocks represent diagrammatically various system parts that will be described in detail when reference is made to the subsequent figures and having the functions described below.

Blocks designated by letters $G_1$, $G_2$, $G_3$, represent geophones which are used for converting earth vibrations into corresponding electrical vibrations.

A geophone includes usually a simple dynamical system characterized by an inertia coefficient $m$, friction coefficient $\epsilon$, resilience coefficient $b$ and which is adapted to translate the motion of the earth into a relative motion of two masses. The motion of the earth can be represented by a function $a(t)$ which gives the displacement of a given earth particle from its neutral position at any instant $t$, while the relative motion of two masses can be expressed by the function $y(t)$ which gives the distance between these two masses at any instant $t$. The equation describing the motions involved can be expressed as follows:

$$m\frac{d^2y(t)}{dt^2}+\epsilon\frac{dy(t)}{dt}+by(t)=-m\frac{d^2a(t)}{dt^2} \quad (4)$$

The function $a(t)$ resulting from the earth motion shall be designated as "the input function" while the function $y(t)$ resulting from the motion of the system shall be designated as the "output function".

(For literature on geophones see: C. A. Heiland, "Certain instrument problems in reflecting seismology", Trans. A. I. M. E. vol. 110, p. 411–452, 193 and the attached bibliography p. 452–454.)

By dimensioning properly the constants of the system (i. e. by taking its natural frequency as low as possible, by increasing for instance the value of $m$) the terms $$\epsilon\frac{dy(t)}{dt}$$

and $by(t)$ in the Equation (4) can be made negligible when compared with the terms $$m\frac{d^2y(t)}{dt^2}$$

and $$-m\frac{d^2a(t)}{dt^2}$$

and consequently the Equation (4) will be substantially equivalent to the equation:

$$m\frac{d^2y(t)}{dt^2}=-m\frac{d^2a(t)}{dt^2} \quad (5)$$

whence $$y(t)=-a(t) \quad (6)$$

and the output function of the system will represent substantially the displacement of the earth particles.

By selecting the constants of the system so as to make its natural frequency as high as possible (by increasing the value of $b$) the terms $$m\frac{d^2y(t)}{dt^2}$$

and $$\epsilon\frac{dy(t)}{dt}$$

may be made negligible when compared with the remaining terms in the Equation (4) and consequently the following equation is obtained:

$$by(t)=-m\frac{d^2a(t)}{dt^2} \quad (7)$$

and the output function of the system represents substantially the acceleration of the earth particles.

It is therefore obvious that the relation between the output function $y(t)$ and the input function $a(t)$ as expressed by the Equation (4) is of such a nature that by selecting properly the constants of the system the output function may represent either the displacement or the acceleration of the earth particles or some other function depending upon the earth motion.

In this particular embodiment we prefer to use a geophone of the Galitzin type in which the relative motion $y(t)$ of two masses is used to generate an electromotive force substantially proportional of their relative velocity.

The outputs of geophones $G_1$, $G_2$, $G_3$, are individually amplified by means of suitable electronic arrangements contained in blocks $A_1$, $A_2$, $A_3$. The blocks $A_1$, $A_2$, $A_3$, are individually connected to electric filters $F_1$, $F_2$, $F_3$. The purpose of the electric filters is to eliminate certain undesirable frequencies from the record of the earth oscillations. The most predominant low frequency oscillations occurring in the earth (commonly known as "ground roll") are of the frequency range of about 10–20 cycles per second and are due to waves that propagate themselves along the surface of the earth. The filters $F_1$, $F_2$, $F_3$ attenuate frequencies below 30 cycles per second and among others the ground roll frequencies and pass the frequencies above 30 cycles which include waves resulting from reflected, refracted and diffracted paths.

Consider now the various instrumental steps associated with the geophone $G_1$, followed by the amplifier $A$, and filter $F_1$. Let the output voltage of the filter $F_1$, at any instant be designated by a function $A_1(t)$. The function $A_1(t)$ represents largely those frequency components of the geophone output which exceed 30 cycles per second and consequently represents mainly the contribution due to reflected, refracted, and diffracted waves and is characterized by a relative absence of the ground roll effects.

The voltage $A_1(t)$ delivered by the filter $F_1$ is applied to a block $I_1$ and is also applied to a block $S_{12}$. The block $I_1$ represents a circuit arrangement for performing the process of integration electrically i. e. the block receives across its input terminals the voltage $A_1(t)$ and deliver across its output terminals a voltage proportional to $$\int_0^t A_1(t)dt$$

The block $S_{12}$ represents a circuit arrangement for performing the process of squaring electrically i. e. it receives across its input terminals the voltage $A_1(t)$ and delivers across its output terminals a voltage represented by the function $K_2[A_1(t)]^2$ (where $K_2$ is the corresponding coefficient of proportionality). The block $I_1$ is connected to the block $S_{11}$ containing a circuit arrangement which performs the process of squaring electrically in the same manner as $S_{12}$. Consequently the block $I_1$ transmits to $S_{11}$ the voltage proportional to $$\int_0^t A_1(t)dt$$

and the block $S_{11}$ delivers across its output terminals a voltage represented by the function $$K_1\left[\int_0^t A_1(t)dt\right]^2$$

(where $K_1$ is the corresponding coefficient of proportionality).

Since the function $A_1(t)$ represents the velocity of an earth particle, the expression $K_2[A_1(t)dt]^2$ represents the kinetic energy, while the expression $$\int_0^t A_1(t)dt$$

corresponds to the displacement and $$K_1\left[\int_0^t A_1(t)dt\right]^2$$

to the potential energy.

In order to represent the kinetic energy and the potential energy on the same scale the coefficient $K_2$ must correspond to the mass of the oscillating particle and the coefficient $K_1$ to the coefficient of elasticity. It is well known that:

$$\frac{K_1}{K_2}=4\pi^2 f^2 \qquad (8)$$

where $f$ is the natural frequency of the earth particle when displaced from its natural position. The most predominant frequency appearing in the seismic records is subsequently equal to 40 cycles and it is assumed that it represents the natural frequency of an oscillating earth particle. Consequently $\omega$ is usually taken in the neighborhood of 40 cycles and the formula determines the ratio $K_1/K_2$ necessary for the proper calibration of the blocks $S_{11}$ and $S_{12}$.

In such a manner we have provided means for producing across the output terminals of the block $S_{11}$ a voltage representing the potential energy and across the block $S_{12}$ a voltage representing the kinetic energy of an earth particle participating in the ground motion. These two are then combined at $d_1$ in such a manner that the voltage impressed on the recorder R is the sum of their individual voltages.

The recorder R contains galvanometers which are adapted to respond to the voltage applied across its input terminals and cause beams of light to produce photographic records on the moving film in a manner well known in the art. The photographic record thus produced represents the variation in the energy content of an earth particle the motion of which is detected by the geophone $G_1$.

In a similar manner the motion of the earth particles detected by the geophones $G_2$ and $G_3$ causes corresponding voltages to be amplified and to be forwarded to the filters $F_2$ and $F_3$ respectively. The output of filters $F_2$ and $F_3$ are subjected to the same instrumental steps as the voltage delivered by $F_1$, and the arrangement including blocks $F_2$, $I_2$, $S_{22}$, $S_{21}$, R as well as the arrangement including blocks $F_3$, $I_3$, $S_{32}$, $S_{31}$, R is similar to the arrangement containing $F_1$, $I_1$, $S_{12}$, $S_{11}$ as it is shown clearly in the schematic diagram of Figure 3.

The blocks $I_2$ and $I_3$ are similar in their structure and operation to the blocks $I_1$, $S_{21}$ and $S_{31}$ are similar to $S_{11}$, $S_{22}$ and $S_{32}$ are similar to $S_{12}$. Accordingly the energy contents of earth particles the motion of which is detected by geophones $G_2$ and $G_3$ respectively impress themselves on the photographic record contained in R in the same manner as the energy detected by the geophone $G_1$.

Figure 4:
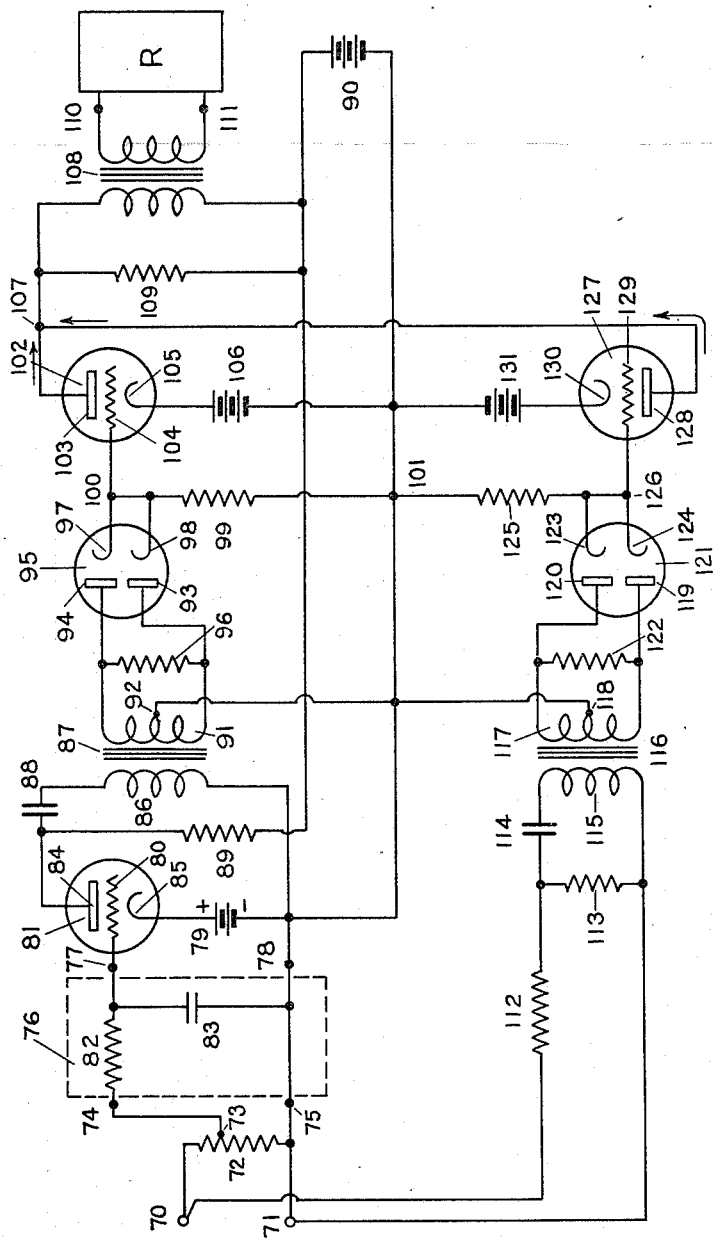
Figure 4 shows wiring diagrams of certain parts of Figure 3.

A wiring diagram of the arrangement included in blocks $I_1$, $S_{11}$ and $S_{12}$ is shown in Figure 4. Referring now more particularly to this figure, numerals 70 and 71 represent the output terminals of the filter $F_1$ (shown in Figure 3). Across the terminals 70 and 71 is inserted a potentiometer consisting of a resistor 72 provided with a tap terminal 73. The terminals 73 and 71 are connected to the input terminals 74 and 75 of an electrical network contained in the rectangle 76. This network shall be designated hereafter as an integrator. One of the output terminals 78 of the integrator is connected to the negative terminal of the battery 79 while the other output terminal 77 is connected to the grid 80 of the electronic tube 81. The integrator 76 consists of a resistor 82 inserted between the terminals 74 and 77 and of a capacitor 83 inserted between the terminals 77 and 78. The electronic tube 81 includes a plate 84, grid 80 and cathode 85. The cathode 85 is connected to the positive terminals of the battery 79 while the negative terminal of the battery 79 is connected to the plate 84 by means of two paths one of which includes the primary winding 86 of a transformer 87 in series with a condenser 88 and the other path includes a battery 90 in series with a resistor 89. The secondary winding 91 of the transformer 87 is provided with a midpoint 92 and has its terminals connected to anodes 93 and 94 of a rectifier tube 95. An appropriate resistance 96 is inserted between the anodes 93 and 94. The rectifier tube 95 possesses two cathodes 97 and 98 which are connected through the resistor 99 to the midpoint 92 of the winding 91. A three electrode tube 102 is provided, which contains an anode 103, grid 104 and cathode 105. The grid 104 of the tube 102 is connected to the cathodes 97 and 98 of the rectifier tube 95 directly, while the cathode 105 of the tube 102 is connected to the cathodes 97 and 98 of the rectifier tube 95 by means of a path consisting of a battery 106 in series with a resistor 99. The plate 103 is connected to the cathode 105 by means of a path consisting of a primary winding of the transformer 108 shunted by the resistor 109 and in series with battery 90 and with the battery 106.

The terminals 70 and 71 are connected one with another by means of an additional path consisting of a resistor 112 in series with the resistor 113. The resistor 113 is shunted by the capacitor 114 in series with the primary winding 115 of a transformer 116. The secondary winding 117 of the transformer 116 is provided with a midpoint 118 and has its terminals connected to anodes 119 and 120 of a rectifier tube 121. An appropriate resistor 122 is inserted between the anodes 119 and 120. The rectifier 121 possesses two cathodes 123 and 124 which are connected through a resistor 125 to the midpoint 118 of the winding 117. An electronic tube 127 is provided which consists of an anode 128, grid 129 and a cathode 130. The cathode 130 is connected through the battery 131 to the positive terminals of the battery 106 while the grid 129 is connected directly to the cathodes 123 and 124 of the rectifier tube 121 and the anode 128 is connected directly to the anode 103 of the electronic tube 102 by means of a common terminal 107. The secondary winding of the transformer 108 possesses output terminals 110 and 111 which are connected directly to the recording instrument R.

The operation of the device can be explained as follows:

Assume that the geophones $G_1$, $G_2$, $G_3$ (in Figure 3) are of the velocity type and consequently the voltage $A_1(t)$ delivered by the filter $F_1$, (in Figure 3), corresponds to the velocity of the earth particles and represents mainly those components which are caused by the refracted, reflected, and diffracted waves and in which the contribution due to the ground roll has been substantially eliminated.

Referring now more particularly to Figure 4: the voltage $A_1(t)$ is applied to the input terminals 70 and 71 across the resistor 72 and is subsequently transmitted to the input terminals 74 and 75 of the integrator 76. The integrator 76 integrates the input function $A_1(t)$ "electrically" i. e. it delivers across its output terminals 77 and 78 a voltage which is proportional to $$\int_0^t A_1(t)dt$$

The manner in which the output voltage $$\int_0^t A_1(t)dt$$

is produced can be explained as follows:

Let C be the capacitance of the capacitor 83, R the resistance of the resistor 82 and $i(t)$ the current flowing through the resistor 82. Assume also that the output terminal 77 of the integrator 76 has been disconnected from the grid 80 of the tube 81. Consequently the same current $i(t)$ flows through the capacitor 83 and through the resistor 82 and the relation holds true:

$$A_1(t) = Ri(t) + \frac{1}{pC}i(t) \qquad (9)$$

where $p$ denotes the operator $$\frac{d}{dt}$$

(as used in the Heaviside's operational calculus). See Carson: J. R. Carson, "Electric Circuit Theory and Operational Calculus", McGraw-Hill Book Co., New York, N. Y., 1926. Following the methods of operational calculus the current $i(t)$ can be expressed as follows:

$$i(t) = \frac{pC}{pCR+1} \qquad (10)$$

And the voltage $A_2(t)$ across the capacitor 83:

$$A_2(t) = \frac{1}{pCR+1}A_1(t) \qquad (11)$$

By taking $CR \gg 1$ the following relation may hold with an approximation satisfactory for practical purposes:

$$A_2(t) = \frac{1}{pCR}A_1(t) \qquad (12)$$

which by using conventional notation may be written as:

$$A_2(t) = \frac{1}{CR}\int_0^t A_1(t)dt \qquad (13)$$

Consequently the expression (13) which represents the voltage drop $A_2(t)$ across the condenser 83 between the output terminals 77 and 78 represents the time integral of the input voltage $A_1(t)$. The Relation (13) results from the assumption that $pCR+1 \approx pCR$ in the Expression (11) and the approximation obtained has been found to be satisfactory by taking C equal to 1 microfarad and R equal to 300,000 ohms.

The voltage $A_2(t)$ delivered across the output terminals 77 and 78 of the integrator 76 is subsequently applied between the negative terminal of the battery 79 and the grid 80 of the triode 81. The battery 79 constitutes the grid bias of the amplifier 81 and has been properly selected in order to make the amplifier characteristics substantially rectilinear. Consequently in the plate circuit of the amplifier 81 there appears across the winding 86 a voltage which is substantially proportional to $A_2(t)$ and is magnified to an extent depending upon the coefficient of amplification of the tube 84.

This voltage is subsequently transmitted through the transformer 87 to the anodes 93 and 94 of the rectifier tube 95 and causes a rectified voltage proportional to $|A_2(t)|$ to appear across the output terminals 92 and 100 of the rectifier and to be subsequently applied between the terminals 101 of the battery 106 and the grid 104 of the tube 102. The tube 102 and the grid bias supplied by the battery 106 have been chosen in such a manner that the plate current of the tube varies substantially as the square of the voltage applied across the terminals 100 and 101. Accordingly, since a voltage proportional to $|A_2(t)|$ has been applied across the terminals 100 and 101 the plate current of the tube 102 can be expressed by the function: $K_1[A_2(t)]^2$ where $K_1$ is the proportionality factor determined by the constants of the circuit.

The voltage $A_1(t)$ applied between the terminals 70 and 71 is also transmitted through the resistor 112 to a circuit consisting of a resistor 113 in parallel with the capacitor 114 and the primary winding 115 of the transformer 116. We prefer to use the resistor 113 substantially equal to the resistor 89, the capacitor 114 substantially equal to the capacitor 88 and the transformer 116 having substantially the same characteristics as the transformer 87. In such a manner we transmit across the anodes 119 and 120 of the rectifier 121 a voltage which substantially reproduces the input voltage $A_1(t)$. This voltage produces a rectified current flowing between the terminals 118 and 126 and causes a voltage drop across the resistor 125. The voltage derived from the resistor 125 is in turn applied between the negative terminal of the battery 131 and the grid 129 of the tube 127.

The tube 127 and the grid bias supplied by the battery 131 have been chosen in such a manner that the plate current of the tube varies substantially as the square of the voltage applied across the terminals 101 and 126. Accordingly, since a voltage proportional to $A_1(t)$ has been applied across the terminals 101 and 126, the plate current of the tube 127 can be expressed by the function: $K_2[A_1(t)]^2$ where $K_2$ is the proportionality factor which is determined by the constants of the circuit.

The plate currents of the tubes 103 and 127 flow in the directions indicated by respective arrows toward a common point 107. Consequently the current flowing from the point 107 toward the resistor 109 is equal to the sum of the respective plate currents and can be represented by the formula:

$$K_1[A_2(t)]^2 + K_2[A_1(t)]^2 \quad (14)$$

It will be observed that the term $K_1[A_2(t)]^2$ is proportional to the potential energy of an earth particle, the term $K_2[A_1(t)]^2$ is proportional to the kinetic energy and the respective values $K_1$ and $K_2$ are chosen in such a manner that the Expression (14) represents the total energy of the earth particle. Assuming that there is no leakage through the primary winding of the transformer 108 we may consider that the current expressed by the Formula (14) passes entirely from the point 107 into the resistor 109 and causes across the terminals of this resistor a voltage drop which is substantially proportional to the Expression (14) and consequently represents the total energy of the earth particle. This voltage drop is subsequently transmitted through the input terminals 110 and 111 to the recording apparatus R in which it impresses itself on a strip of photographic paper.

In such a manner we have provided means for automatically registering the energy content of an earth particle participating in the earth motion. The geophones used for detecting the motion of the particle are of the velocity type.

Assume now that the geophones $G_1$, $G_2$, $G_3$ (in Figure 3) used to detect the earth vibrations are not of the velocity type but of the displacement type and let the output voltage of the filter $F_1$ (in Figure 3) be represented by a function $B_1(t)$. (The displacement type geophones are well known in the art and one of them has been described by G. A. Ireland in "A Study of Some Seismometers" published by the United States Dept. of Interior, Bureau of Mines, Technical Paper 556, Washington, D. C., 1934.) The function $B_1(t)$ derived from the filter $F_1$ represents the displacement of the earth particles and corresponds mainly to those frequency components which are caused by the refracted, reflected and diffracted waves and which the contribution due to the ground roll has been substantially eliminated. It will be observed then that the potential energy of an earth particle will be represented by $K_1[B_1(t)]^2$, the kinetic energy by $$K_2\left[\frac{dB_1(t)}{dt}\right]^2$$

(where $K_1$ and $K_2$ are properly chosen proportionality factors) and the total energy will be represented by the formula:

$$K_1[B_1(t)]^2 + K_2\left[\frac{dB_1(t)}{dt}\right]^2 \quad (15)$$

In order to produce a photographic record of the energy function expressed by the Formula (15) when a voltage varying as $B(t)$ is available, we propose an arrangement which may be considered as a modification of Figure 4. The modification consists in replacing in Figure 4 the integrator 76 by another circuit arrangement which shall be designated as a derivator. The derivator is shown diagrammatically in the rectangle 150 of Figure 4a and it is adapted to perform the process of derivation electrically in such a manner that when it receives between its input terminals 74 and 75 a certain voltage it delivers across its output terminals 77 and 78 another voltage varying substantially as the derivative with respect to time of the input voltage. The derivator 150 consists of a capacitor 151 inserted between the terminals 74 and 77 of the resistor 152 inserted between the terminals 77 and 78.

The operation of the derivator can be explained mathematically as follows:

Let $B_1(t)$ be the function representing the voltage applied across the input terminals 74 and 75 of the derivator 150, $B_2(t)$ the function representing the voltage across the output terminals 77 and 78, $C^1$ the capacitance of the capacitor 151, $R^1$ the resistance of the resistor 152 and $i(t)$ the current flowing through the capacitance 151. Assume also that the output terminals 77 and 78 of the derivator 150 have been disconnected from the tube 81. Consequently the same current $i(t)$ flows through the capacitance 151 and through the resistance 159 and the following relation holds true:

$$B_1(t) = \frac{1}{C^1}\int_0^t i(t)dt + R^1 i(t) \quad (16)$$

Differentiating the Equation (16) we obtain:

$$\frac{dB_1(t)}{dt} = \frac{1}{C^1}i(t) + R^1\frac{di(t)}{dt} \quad (17)$$

By selecting the proper values of the resistance $R^1$, for example, making $R^1$ negligibly small, the term $R^1 di/dt$ can be made negligible as compared to $i(t)/C^1$ and the following relation may hold with an approximation satisfactory for practical purposes:

$$\frac{dB_1(t)}{dt} = \frac{1}{C^1}i(t) \quad (18)$$

Multiplying both sides of the Equation (14) by $C^1 R^1$ we obtain:

$$C^1 R^1 \frac{dB_1(t)}{dt} = R^1 i(t) = B_2(t) \quad (19)$$

Consequently the expression $R^1 i(t)$ which represents the voltage drop across the resistor 152 between the output terminals 77 and 78 is substantially proportional to $dB_1(t)/dt$ which represents the time derivative of the input voltage across the terminals 77 and 78. The Relation (19) results from neglecting the term $R^1 di/dt$ in the Equation (17) and the approximation obtained has been found to be satisfactory by taking $C^1$ equal to 0.0003 microfarad and $R^1$ equal to 10,000 ohms.

Consider now again Figure 4 and assume that the integrator 76 has been substituted by the derivator 150 (shown in Figure 4a) and that the voltage $B_1(t)$ has been applied across the input terminals 70 and 71. The voltage delivered across the output terminals 77 and 78 of the derivator 150 will be proportional to $dB_1(t)/dt$. This voltage is amplified in 81, rectified in 95 and subsequently applied between the terminals 101 of the battery 106 and the grid 104 of the tube 102. Then the plate current of the tube 102 can be expressed by the function $K_2[dB_1(t)/dt]^2$ where $K_2$ is the corresponding proportionality factor determined by the constants of the circuit.

The voltage $B_1(t)$ applied between the terminals 70 and 71 is also transmitted through the transformer 116 to the anodes 120 and 119 of the rectifier 121 and is subsequently rectified and applied between the positive terminal of the battery 131 and the grid 129 of the tube 127. Then the plate current of the tube 127 can be expressed by the function $K_1[B_1(t)]^2$ where $K_1$ is the corresponding proportionality factor determined by the constants of the circuit.

The plate currents of the tubes 103 and 127 flow in the directions indicated by the respective arrows toward the common point 107. Consequently the current flowing from the point 107 toward the resistor 109 is the equal of the sum of the respective plate currents and is represented by the energy Function (15). This current causes a voltage drop across the resistor 109 and is transmitted to the recording apparatus R.

In such a manner we have provided means for the registration of energy when the geophones used for detecting the earth motion are of the displacement type.

In order to illustrate the advantages of our invention we have shown two seismograms in Figures 5 and 6. The seismogram of Figure 6 has been obtained by means of the arrangement of Figure 4 and represents the energy variations recorded in a given locality by means of a geophone suitably placed and produced by the detonation of 1¼ pounds of dynamite at 40 feet below the earth's surface. Figure 5 represents a conventional seismograph record obtained by means of the arrangement of the prior art under the same conditions (i. e. 1¼ pounds of dynamite, at 40 feet below the earth's surface and at the same spot as that of Figure 6). Since the conditions existing during the records of Figure 5 and Figure 6 are the same the various reflected, refracted and direct waves have produced the same motions at the geophones.

The photographic records of the earth vibrations usually represent a rather complex oscillatory motion resulting from several wave paths. Upon a closer examination such a record may be thought to consist of segments each of which containing an oscillatory curve substantially sinusoidal in character. Certain transition points may be found between two adjoining segments such points determining a change in the character of the oscillatory curve (i. e. change in frequency or amplitude of the curve which roughly approximates a damped sinusoid). These transitions occur at certain critical instants corresponding to a new energy contribution resulting from the arrival of an additional wave impulse. In the energy seismogram of Figure 6 the determinacy of the transition points is considerably increased and one is able to identify the reflection points $a$, $b$, $c$ with a much greater facility and precision.

It will be observed that the number of oscillations in Figure 6 is considerably smaller than in Figure 5. This is due to the fact that to a purely sinusoidal displacement would correspond to a constant energy value and the energy function would be represented by a straight line. The motion of the earth is oscillatory and in the first approximation it may be considered as a succession of sinusoidal fragments. To each sinusoidal fragment would correspond a constant energy, i. e. a straight line and consequently the energy function may be considered as a succession of straight line segments and to the beginning of each segment would correspond an instant at which the change of energy value takes place.

From further comparison of Figure 5 and Figure 6 we see that the energy recording device possesses the property of translating the earth motion which is oscillatory and substantially sinusoidal into the energy variations which are less subject to oscillations.

We have found that for the proper study of the earth motion it is not always necessary to produce a record of the energy function and that another function which is capable of translating a substantially sinusoidal motion into a substantially steady motion may be successfully used for the proper identification of the reflection points. We wish therefore to enlarge the scope of our invention and in further embodiments we are showing methods and means which are not directly related to energy recording.

Consider again the modified arrangement of Figure 4 which includes the features shown in Figure 4a and assume that the voltage $A_1(t)$ derived from a velocity geophone has been applied across the input terminals 70 and 71. Thus the voltage $A_1(t)$ will be subjected to the same instrumental steps as the voltage $B_1(t)$ in the previously described example and it will be readily understood by those skilled in the art that a voltage varying substantially as:

$$K_1[A_1(t)]^2 + K_2\left[\frac{dA_1(t)}{dt}\right]^2 \quad (20)$$

will appear across the output terminals 110 and 111 and will be recorded in R. It is obvious that the Expression (20) does not have any definite physical meaning and does not represent the energy because the function $A_1(t)$ corresponds to the displacement and not to the velocity of the earth motion. It has been found, however that the record of the Function (20) presents certain obvious advantages and facilitates to a very great extent the reading and the proper interpretation of the earth vibrations. This results not from the physical but from the mathematical properties of the Function (20) which permits to transform a substantially sinusoidal function into a substantially steady function.

In order to illustrate the properties of the Function (20) let the input voltage across the terminals 70 and 71 be $A_1(t) = M_1 \sin 2\pi ft$. The corresponding voltage across the output terminals 110 and 111 is represented by the Function (20) which in the particular case when $A_1(t) = M_1 \sin 2\pi ft$ will be reduced to the value $M_1^2$ (when the relation (S) is taken into account). In such a manner we have provided means for transforming a pure sinusoidal voltage into a steady voltage and we consider this to be of particular importance in the recording of seismic waves.

In the actual interpretation of the seismic records we are interested in identifying the reflection points corresponding to the change of energy content of the oscillating earth particles and consequently instead of studying the energy function directly we may study the derivative of the energy function in order to identify the reflection points.

A record of the derivative of the energy function may be obtained by connecting the output terminals 110 and 111 of the device shown in Figure 4 to the derivator 200 (shown in Figure 4b). The derivator 200 (similar to the one designated by 150 in Figure 4a) has its output terminals 201 and 202 connected to the recorder and it includes a capacitor 203 inserted between the terminals 110 and 201 and a resistor 204 inserted between the terminals 201 and 202. It will be observed then that the voltage representing the energy Function (14) will be transmitted through the input terminals 110 and 111 to the derivator 200. Across the output terminals 201 and 202 there will appear a voltage which will vary substantially as a derivative of the energy function and will be subsequently recorded in R.

Mathematically, the derivative of the energy function will be expressed as follows:

$$\frac{d}{dt}\left\{K_1\left[\int_0^t A_1(t)dt\right]^2 + K_2[A_1(t)]^2\right\} =$$
$$= 2A_1(t)\left[K_1\int_0^t A_1(t)dt + K_2\frac{dA_1(t)}{dt}\right] \quad (21)$$

and will consist of a product of two terms: the term $2A_1(t)$ and the term $$K_1\int_0^t A_1(t)dt + K_2\frac{dA_1(t)}{dt}$$

In the study of the earth vibrations satisfactory results may be obtained in some instances by studying only one of the above terms entering in the expression of the derivative of the energy function and namely the term $$K_1\int_0^t A_1(t)dt + K_2\frac{dA_1(t)}{dt} \quad (22)$$

The Expression (22) is capable of translating a sinusoidal motion of the frequency $\omega$ (determined by the Formula (8)) into a substantially steady motion, because when substituting $\sin \omega t$ in (22) this expression is reduced to zero. Consequently the Expression (22) possesses certain properties which are somewhat similar to those of the Expression (20) and is capable of translating a substantially sinusoidal motion into a substantially steady motion thus increasing the determinacy of the reflection points in the manner indicated above.

Figure 7:
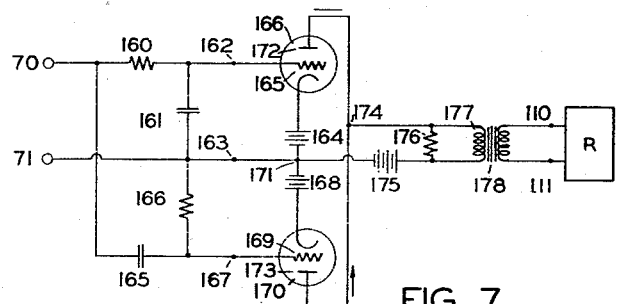
Figure 7 represents a second embodiment of the invention.

We are therefore proposing another embodiment of our invention shown diagrammatically on Figure 7 and intend to produce a photographic record of the Expression (22). The arrangement shown comprises an integrator and a derivator which are respectively connected to the input terminals 70 and 71. The integrator (similar to the one included in the dotted rectangle 76 of Figure 4) includes a resistor 160, one terminal of which is connected to the input terminal 70 and the other terminal of which is connected to the input terminal 71 through the capacitor 161. The output terminals 162 and 163 of the integrator are connected to the negative terminal of the battery 164 and to the grid 165 of the tube 166 respectively. The derivator (similar to the one contained in the dotted rectangle 150 of Figure 4a) includes the capacitor 165 one terminal of which is connected to the input terminal 70 and the other terminal of which is connected to the input terminal 71 through the resistor 166. The output terminals 163 and 167 of the derivator are connected to the negative terminal of the battery 168 and to the grid 169 of the tube 170 respectively. The negative terminal of the battery 164 has a common terminal 171 with the negative terminal of the battery 168 and the plate 172 of the tube 166 is connected to the plate 173 of the tube 170 through a common terminal 174. The terminals 171 and 174 are connected one with another by means of a path which includes a battery 175 in series with a resistor 176 and the resistor 176 is shunted by a primary winding 177 of the transformer 178. The secondary winding of the transformer 178 is connected through the output terminals 110 and 111 to the recorder R.

The operation of the device can be explained as follows: Assume that the geophones used to detect the earth vibrations are of the velocity type and let the output voltage of the filter $F_1$ (in Figure 3) be represented by the function $A_1(t)$. The function $A_1(t)$ represents the velocity of the earth particles and corresponds mainly to those frequency components which are caused by the refracted, reflected and diffracted waves and in which the contribution due to the ground roll has been substantially eliminated. The voltage $A_1(t)$ applied across the input terminals 70 and 71 will be transmitted to the integrator and to the derivator. Across the output terminals 162 and 163 of the integrator there will appear a voltage varying substantially as $\int A_1(t)dt$ while across the output terminals 167 and 163 of the derivator the voltage will vary substantially as the function $$\frac{dA_1(t)}{dt}$$

These voltages are subsequently amplified by the tubes 166 and 167 so that the plate current of the tube 166 is expressed by the function $$K_1\int_0^t A_1(t)dt$$

and the plate current of the tube 170 is expressed by the function $$K_2\frac{dA_1(t)}{dt}$$

(where the proportionality coefficients $K_1$ and $K_2$ determine the proper selection of the constants of the circuit). These plate currents flow in the directions indicated by arrows toward the common terminal 174. Thus the current flowing from the terminal 174 toward the resistor 176 is equal to the sum of the respective plate currents and is expressed by (22). Assuming that there is no leakage through the primary winding 177 of the transformer 178, we may consider that the current expressed by the Formula (22) passes entirely from the point 174 into the resistor 176 and causes across the terminals of this resistor a voltage drop which is substantially proportional to the Expression (22). This voltage is subsequently transmitted to the output terminals 110 and 111 and to the recorder R. Thus we have provided means for automatically registering the instantaneous value of the Expression (22). For the reasons which have been explained above the record of this expression increases the determinacy of the reflection points and thus facilitates the proper interpretation of the seismic vibrations.

It may be readily understood that various other functions may be used in connection with the recording of the earth motion. Let $f(t)$ represent the output of the geophone, the symbol $d^n/dt^n$ denotes differentiation of the order $n$, the symbol $d^{-m}/dt^{-m}$ denotes integration of the order $m$; $k$ is a positive or negative integer, $r$ is an odd integer, $K_1$ and $K_2$ are properly chosen components. Then by using means explained above we can register the expression:

$$K_1\left[\frac{d^k}{dt^k}f(t)\right]^2 + K_2\left[\frac{d^{k+r}}{dt^{k+r}}f(t)\right]^2 \quad (23)$$

and to observe the obtained record for the points of reflection. It is noted that if $f(t) = A(t)$, $k=0$, $r=1$ the above expression can be made to represent the Formula (20).

In a similar manner we may consider a function representing the time derivative of the Expression (23), i. e.

$$\frac{d}{dt}\left\{K_1\left[\frac{d^k}{dt^k}f(t)\right]^2+K_2\left[\frac{d^{k+r}}{dt^{k+r}}f(t)\right]^2\right\} \quad (24)$$

or the function $$K_1\frac{d^k}{dt^k}f(t)+K_2\frac{d^{k+s}}{dt^{k+s}}f(t) \quad (25)$$

where $s$ is an even integer. It is noted that when $f(t)=A(t)$, $k=-1$, $s=2$ this formula represents the Expression (22).

Figure 8:
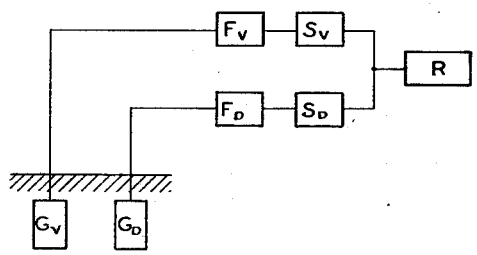
Figure 8 represents a third embodiment of the invention.

Another embodiment of our invention is shown diagrammatically in Figure 8. $G_D$ represents a displacement geophone of the type described in the above referred to article by G. A. Ireland and $G_V$ represents a velocity type geophone which may be of the Galitzin type. The outputs of geophones $G_D$ and $G_V$ are transmitted to the respective filters $F_D$ and $F_V$ which eliminate the effects resulting from the ground roll disturbance. Consequently there appears across the output terminals of filters $F_D$ and $F_V$ voltages $A_1(t)$ and $B_1(t)$ which correspond respectively to the displacement and to the velocity of the ground motion and represents mainly the frequency components due to the reflected, refracted and diffracted waves and are characterized by a relative absence of ground roll effects. The voltages $A_1(t)$ and $B_1(t)$ are subsequently squared in the squaring devices $S_D$ and $S_V$ similar to those indicated by $S_{11}$, $S_{12}$, $S_{21}$, etc. in Figure 3 and their output is added and recorded in the recording apparatus R. It is obvious to those skilled in the art that the squared voltage delivered by $S_D$ represents subsequently the potential energy of the oscillating earth particle associated with the earth motion and the squared voltage delivered by $S_V$ represents the kinetic energy. Consequently the voltage recorded in R represents the total energy of the earth particle.

It is therefore apparent that we have provided a novel method and means for producing seismographic records in which the determinacy of the reflection points will be considerably increased. The calculations employing the interval of time between the time of detonation and the time of reception of the reflected waves, is, therefore accurate and it is possible to obtain substantially the exact depth of the subterranean beds at the points of reflection.

When reference is made to a "geophone", it is intended to include any electromechanical transducer which transforms one type of vibratory motion into another, and to designate instruments commonly known as geophones, seismographs, seismometers, seismoscopes, microphones, detectors, magnetophones, etc.

The expression "recorder" is intended to include any transducer which, when acted upon by earth vibrations, produces a registration of the said vibrations, such a transducer may be of the mechanical, electromechanical or other type, and may consist of and include in its construction means for receiving, detecting, translating, transmitting, amplifying, indicating, and registering the said vibrations, or means for doing any of these things in addition to indicating or recording.

The expression "at the earth's surface" is intended to include a relatively thin stratum of the earth close to its surface.

When reference is made to a derivative of a magnitude or an effect it is meant to designate a magnitude or an effect which has been obtained from a given magnitude or a given effect and which varies according to a function which is a time derivative of the function expressing the variation of the given magnitude or of the given effect, such as a time derivative of the first order, or of the second order, or of the first order combined with the second order or of any higher order, or two or a plurality of derivatives combined in any way.

When reference is made to a "derivator" it is meant to designate one or two or three, or a plurality of derivators arranged in an appropriate way, it will be understood that one derivator only may be used, or two, or any plurality of derivators.

When reference is made to an integral of a magnitude or of an effect it is meant to designate a magnitude or an effect which has been obtained from the given magnitude or the given effect and which varies according to a function which is an integral of the function expressing the variation of the given magnitude or effect, such as a time integral of the first order or of the second order, or of the first order combined with the second order or any higher order, or two or a plurality of integrals combined in any way.

When reference is made to an "integrator" it is meant to designate one or two or three or a plurality of integrators arranged in an appropriate way.

When reference is made to the square of a magnitude or of an effect it is meant to designate a magnitude or an effect which has been obtained from a given effect and which varies according to a function which is the square of the function expressing the variation of the given magnitude or effect.

In view of our invention and disclosure variations and modifications to meet individual whim or particular need will doubtless become evident to others skilled in the art, to obtain part or all of the benefits of our invention without copying the structure shown, and we, therefore, claim all such in so far as they fall within the reasonable spirit and scope of our invention.

We claim:

1. The method of seismic surveying which comprises creating a disturbance below the earth's surface, receiving the several waves thus formed, translating these waves into electrical vibrations, applying the electrical vibrations to an element responsive to their magnitude and their derivative, recording the output of the said element.

2. The method of seismic surveying which comprises creating a disturbance below the earth's surface, receiving the several waves thus formed, translating these waves into electrical vibrations deriving an effect substantially proportional to the square of the vibrations, deriving another effect substantially proportional to the square of the rate of change of the vibrations, adding the two effects, and recording the sum.

3. The method of seismic surveying which comprises creating a disturbance below the earth's surface, receiving the several waves thus formed, translating these waves into electrical vibrations, producing an electrical effect depending upon a derivative of the electrical vibrations, recording the electrical effect.

4. The method of seismic surveying which comprises creating a disturbance below the earth's surface, receiving the several waves thus formed, translating these waves into electrical vibrations, producing an electrical effect depending upon the magnitude of the electrical vibrations and upon the derivative of the said magnitude, recording the electric effect.

5. The method of seismic surveying which comprises creating a disturbance below the earth's surface, receiving the several waves thus formed, translating these waves into electrical vibrations, producing an electric effect depending upon the magnitude of the electrical vibrations and the integral of the said magnitude, recording the electric effect.

6. The method of seismic surveying which comprises creating a disturbance below the earth's surface, receiving the several waves thus formed, translating these waves into electrical vibrations, producing an electric effect depending upon a derivative and an integral of the magnitude of the electrical vibrations, recording the electric effect.

7. The method of seismic surveying which comprises creating a disturbance below the earth's surface, receiving the several waves thus formed, translating these waves into electrical vibrations, producing an electric effect dependent upon the magnitude of the electrical vibrations, producing an electric effect dependent upon the time derivative of the said magnitude, adding the two effects.

8. The method of seismic surveying which comprises creating a disturbance below the earth's surface, receiving the several waves thus formed, translating these waves into electrical vibrations, producing an electric effect depending upon the magnitude of the electric vibrations, producing an electric effect depending upon the time integral of the said magnitude, adding the two effects.

9. The method of seismic surveying which comprises creating a disturbance below the earth's surface, receiving the several waves thus formed, translating these waves into electrical vibrations, producing an electrical effect depending upon the rate of change of the electric vibrations, producing an electric effect depending upon the time integral of the electric vibrations, adding the two effects.

10. The method of seismic surveying which comprises creating a disturbance below the earth's surface, receiving the several waves thus formed, translating these waves into electrical vibrations, producing an electric effect dependent upon the square of the magnitude of the electrical vibrations, producing an electrical effect dependent upon the square of the time derivative of the said magnitude, adding the two effects.

11. The method of seismic surveying which comprises creating a disturbance below the earth's surface, receiving the several waves thus formed, translating these waves into electrical vibrations, producing an electric effect dependent upon the square of the magnitude of the electric vibrations, producing an electric effect dependent upon the square of the time integral of the said magnitude, adding the two effects.

12. The method of seismic surveying which comprises creating a disturbance below the earth's surface, receiving the several waves thus formed, translating these waves into electrical vibrations, producing an electrical effect depending upon the square of the time integral of the electrical vibrations, producing an electrical effect depending upon the square of the deriva-tive of the electrical vibrations adding the two effects.

13. In the method of seismic surveying by creating a disturbance in the earth, receiving the several waves thus formed at a convenient distance from the center of the disturbance, the step consisting in translating the said waves into a varying electrical effect consisting of oscillations, the number of which is smaller than the number of oscillations in the received waves, recording the said electrical effect.

14. In the method of seismic surveying by creating a disturbance in the earth, receiving the several waves thus formed at a convenient distance from the center of the disturbance, translating the said waves into an oscillatory current, deriving from the said oscillatory current another current with a decreased number of oscillations, recording the said derived oscillatory current and observing the record for points of reflection.

15. In the method of seismic surveying by creating a disturbance in the earth, receiving the several waves thus formed at a convenient distance from the center of the disturbance, translating the said wave trains into a succession of damped electrical oscillations, the step which consists in translating each of the damped oscillations into a substantially steady electrical effect, recording the succession of the said electrical effects.

16. The method of seismic surveying which comprises creating a disturbance below the earth's surface, receiving the several waves thus formed, translating these waves into electrical oscillations consisting of a succession of substantially sinusoidal fragments, transforming the substantially sinusoidal fragments into substantially unidirectional fragments, thus increasing the determinacy of points separating these fragments.

17. The method of seismic surveying which comprises creating a disturbance below the earth's surface, receiving the several waves thus formed, translating these waves into electrical vibrations, producing a voltage varying substantially according to a formula $$K_1[f(t)]^2 + K_2\left[\frac{df(t)}{dt}\right]^2$$

where $f(t)$ expresses the said electrical vibrations $K_1$ and $K_2$ are properly chosen constants, recording this voltage.

18. The method of seismic surveying which comprises creating a disturbance below the earth's surface, receiving the several waves thus formed, translating these waves into electric vibrations, producing a voltage varying substantially according to a formula $$K_1[f(t)]^2 + K_2\left[\int_0^t f(t)dt\right]^2$$

where $f(t)$ expresses the said electrical vibrations, $K_1$ and $K_2$ are properly chosen constants, recording this voltage.

19. The method of seismic surveying which comprises creating a disturbance below the earth's surface, receiving the several waves thus formed, translating these waves into electric vibrations, producing a voltage varying substantially according to a formula $$K_1 f(t) + K_2\frac{d^2 f(t)}{dt^2}$$

where $f(t)$ expresses the said electrical vibrations, $K_1$ and $K_2$ are properly chosen constants, recording this voltage.

20. The method of seismic surveying which comprises creating a disturbance below the earth's surface, receiving the several waves thus formed, translating these waves into electrical vibrations, filtering certain undesirable frequencies from among the electrical vibrations, producing a voltage varying substantially according to a formula $$K_1[f(t)]^2 + K_2\left[\frac{df(t)}{dt}\right]^2$$

where $f(t)$ expresses the electrical vibrations from which the undesirable frequencies have been eliminated, $K_1$ and $K_2$ are properly chosen constants, recording this voltage.

21. The method of seismic surveying which comprises creating a disturbance below the earth's surface, receiving the several waves thus formed, translating these waves into electrical vibrations, filtering certain undesirable frequencies from among the electrical vibrations, producing a voltage varying substantially according to a formula $$K_1[f(t)]^2 + K_2\left[\int_0^t f(t)dt\right]^2$$

where $f(t)$ expresses the electrical vibrations from which the undesirable frequencies have been eliminated, $K_1$ and $K_2$ are properly chosen constants, recording this voltage.

22. The method of seismic surveying which comprises creating a disturbance below the earth's surface, receiving the several waves thus formed, translating these waves into electrical vibrations, filtering certain undesirable frequencies among the electrical vibrations, producing a voltage varying substantially according to a formula $$K_1 f(t) + K_2 \frac{d^2 f(t)}{dt^2}$$

where $f(t)$ expresses the electrical vibrations from which the undesirable frequencies have been eliminated, $K_1$ and $K_2$ are properly chosen constants, recording this voltage.

23. In a system for geological surveying, means for creating a disturbance in the earth, means for translating the waves resulting from the disturbance into electrical vibrations, means for creating an electrical effect depending upon a time derivative of the magnitude of the electrical vibrations, means for recording the electric effect.

24. In a system for geological surveying, means for creating a disturbance in the earth, a plurality of geophones conveniently placed at the earth's surface, which receive the waves resulting from the said disturbance and translate them into electrical vibrations, means for creating an electrical effect depending upon the magnitude of the electrical vibrations and upon the time derivative of the said magnitude, means for recording the electric effect.

25. In a system for geological surveying, means for creating a disturbance in the earth, a plurality of geophones conveniently placed at the earth's surface, which receive the waves resulting from the said disturbance and translate them into electrical vibrations, means for creating an electrical effect depending upon the magnitude of the electrical vibrations and upon the time integral of the said magnitude, means for recording the electrical effect.

26. In a system for geological surveying, means for creating a disturbance in the earth, a plurality of geophones conveniently placed at the earth's surface, which receive the waves resulting from the said disturbance and translate them into electrical vibrations, means for creating an electrical effect depending upon a derivative and an integral of the magnitude of the electric vibrations, means for recording the electrical effect.

27. In a system for geological surveying, means for creating a disturbance in the earth, a plurality of geophones conveniently placed at the earth's surface, which receive the waves resulting from the said disturbance and translate them into electrical vibrations, means for creating an electrical effect depending upon the magnitude of the electrical vibrations, means for creating an electrical effect depending upon the time derivative of the said magnitude, means for adding and recording the said effects.

28. In a system for geological surveying, means for creating a disturbance in the earth, a plurality of geophones conveniently placed at the earth's surface which receive the waves resulting from the said disturbance and translate them into electrical vibrations, means for creating an electrical effect depending upon the magnitude of the electrical vibrations, means for creating an electrical effect depending upon the time integral of the said magnitude, means for adding and recording the said electrical effects.

29. In a system for geological surveying, means for creating a disturbance in the earth, a plurality of geophones conveniently placed at the earth's surface, which receive the waves resulting from the said disturbance and translate them into electrical vibrations, means for creating an electrical effect depending upon the derivative of the magnitude of the vibrations, means for creating an electrical effect depending upon the integral of the electrical vibrations, means for adding and recording the said effects.

30. In a system for geological surveying, means for creating a disturbance in the earth, means for translating the waves thus produced into electrical vibrations, means for producing a voltage varying substantially as $$K_1[f(t)]^2 + K_2\left[\frac{df(t)}{dt}\right]^2$$

where $f(t)$ represents the electrical vibrations, $K_1$ and $K_2$ are properly chosen constants, means for recording this voltage.

31. In a system for geological surveying, means for creating a disturbance in the earth, means for translating the waves thus produced into electrical vibrations, means for producing a voltage varying substantially as $$K_1[f(t)]^2 + K_2\left[\int_0^t f(t)dt\right]^2$$

where $f(t)$ represents the electrical vibrations, $K_1$ and $K_2$ are properly chosen constants, means for recording this voltage.

32. In a system for geological surveying, means for creating a disturbance in the earth, means for translating the waves thus produced into electrical variations, means for producing a voltage varying substantially as $$K_1 f(t) + K_2 \frac{d^2 f(t)}{dt^2}$$

where $f(t)$ represents the electrical vibrations, $K_1$ and $K_2$ are properly chosen constants, means for recording this voltage.

33. In a system for geological surveying, means for creating a disturbance in the earth, a plurality of geophones conveniently placed at the earth's surface, which receive the waves resulting from the said disturbance and translate them into electrical vibrations, filters eliminating certain undesirable frequencies among the electrical vibrations, and delivering a voltage varying with time $t$ as a function $f(t)$, means for producing a voltage varying substantially as $$K_1[f(t)]^2 + K_2\left[\frac{df(t)}{dt}\right]^2$$

where $K_1$ and $K_2$ are properly chosen constants, means for recording this voltage.

34. In a system for geological surveying, means for creating a disturbance in the earth, a plurality of geophones conveniently placed at the earth's surface, which receive the waves resulting from the said disturbance and translate them into electrical vibrations, filters eliminating certain undesirable frequencies among the electrical vibrations, means for producing a voltage varying substantially as $$K_1[f(t)]^2 + K_2\left[\int_0^t f(t)dt\right]^2$$

where $f(t)$ is the voltage output of the filter, $K_1$ and $K_2$ are properly chosen constants, means for recording this voltage.

35. In a system for geological surveying, means for creating a disturbance in the earth, a plurality of geophones conveniently placed at the earth's surface, which receive the waves resulting from the said disturbance and translate them into electrical vibrations, filters eliminating certain undesirable frequencies among the electrical vibrations, means for producing a voltage varying substantially as $$K_1 f(t) + K_2 \frac{d^2 f(t)}{dt^2}$$

where $f(t)$ is the voltage output of the filter, $K_1$ and $K_2$ are properly chosen constants, means for recording this voltage.

36. The method of seismic surveying, which comprises creating a disturbance below the earth's surface, receiving the several waves thus formed, translating these waves into electrical vibrations, producing a voltage varying substantially according to a formula $$K_1\left[\frac{d^k}{dt^k}f(t)\right]^2 + K_2\left[\frac{d^{k+r}}{dt^{k+r}}f(t)\right]^2$$

where $f(t)$ expresses the said electrical vibrations, the symbol $d^n/dt^n$ denotes differentiation of the order $n$, the symbol $d^{-m}/dt^{-m}$ denotes integration of the order $m$, $k$ is a positive or negative integer, $r$ is an odd integer, $K_1$ and $K_2$ are properly chosen constants, recording this voltage.

37. The method of seismic surveying which comprises creating a disturbance below the earth's surface, receiving the several waves thus formed, translating these waves into electrical vibrations, filtering certain undesirable frequencies from among the electrical vibrations, producing a voltage varying substantially according to a formula $$K_1\left[\frac{d^k}{dt^k}f(t)\right]^2 + K_2\left[\frac{d^{k+r}}{dt^{k+r}}f(t)\right]^2$$

where $f(t)$ expresses the electrical vibrations from which the undesirable frequencies have been eliminated, the symbol $d^n/dt^n$ denotes differentiation of the order $n$, the symbol $d^{-m}/dt^{-m}$ denotes integration of the order $m$, $k$ is a positive or negative integer, $r$ is an odd integer, $K_1$ and $K_2$ are properly chosen constants, recording this voltage.

38. In a system for geological surveying, means for creating a disturbance in the earth, means for translating the waves thus produced into electrical vibrations means for producing a voltage varying substantially as $$K_1\left[\frac{d^k}{dt^k}f(t)\right]^2 + K_2\left[\frac{d^{k+r}}{dt^{k+r}}f(t)\right]^2$$

where $f(t)$ expresses the said electrical vibrations, the symbol $d^n/dt^n$ denotes differentiation of the order $n$, the symbol $d^{-m}/dt^{-m}$ denotes integration of the order $m$, $k$ is a positive or negative integer, $r$ is an odd integer, $K_1$ and $K_2$ are properly chosen constants, recording this voltage.

39. In a system for geological surveying, means for creating a disturbance in the earth, a plurality of geophones conveniently placed at the earth's surface, which receive the waves resulting from the said disturbance and translate them into electrical vibrations, filters eliminating certain undesirable frequencies among the electrical vibrations, means for producing a voltage varying substantially as $$K_1\left[\frac{d^k}{dt^k}f(t)\right]^2 + K_2\left[\frac{d^{k+r}}{dt^{k+r}}f(t)\right]^2$$

where $f(t)$ is the voltage output of the filters, the symbol $d^n/dt^n$ denotes differentiation of the order $n$, the symbol $d^{-m}/dt^{-m}$ denotes integration of the order $m$, $k$ is a positive or negative integer, $r$ is an odd integer, $K_1$ and $K_2$ are properly chosen constants, recording this voltage.

40. The method of seismic surveying which comprises creating a disturbance below the earth's surface, receiving the several waves thus formed, translating these waves into electric vibrations, producing a voltage varying substantially according to a formula $$K_1\frac{d^k}{dt^k}f(t) + K_2\frac{d^{k+s}}{dt^{k+s}}f(t)$$

where $f(t)$ expresses the said electrical vibrations, the symbol $d^n/dt^n$ denotes differentiation of the order $n$, the symbol $d^{-m}/dt^{-m}$ denotes integration of the order $m$, $k$ is a positive or negative integer, $s$ is an even integer, $K_1$ and $K_2$ are properly chosen constants, recording the said voltage.

41. The method of seismic surveying which comprises creating a disturbance below the earth's surface, receiving the several waves thus formed, translating these waves into electric vibrations, filtering out certain undesirable frequencies from the said electrical vibrations, producing a voltage varying substantially according to a formula $$K_1\frac{d^k}{dt^k}f(t) + K_2\frac{d^{k+s}}{dt^{k+s}}f(t)$$

where $f(t)$ expresses the filtered electrical vibrations, the symbol $d^n/dt^n$ denotes differentiation of the order $n$, the symbol $d^{-m}/dt^{-m}$ denotes integration of the order $m$, $k$ is a positive or negative integer, $s$ is an even integer, $K_1$ and $K_2$ are properly chosen constants, recording the said voltage.

42. In a system for geological surveying means for creating a disturbance in the earth, means for translating the waves thus produced into electrical vibrations, means for producing a voltage varying substantially as $$K_1\frac{d^k}{dt^k}f(t) + K_2\frac{d^{k+s}}{dt^{k+s}}f(t)$$

where the function $f(t)$ represents the said electrical vibrations, the symbol $d^n/dt^n$ denotes differentiation of the order $n$, the symbol $d^{-m}/dt^{-m}$ denotes integration of the order $m$, $k$ is a positive or negative integer, $s$ is an even integer, $K_1$ and $K_2$ are properly chosen constants, recording the said voltage.

43. In a system for geological surveying, means for creating a disturbance in the earth, a plurality of geophones conveniently placed at the earth's surface, which receive the waves resulting from the said disturbance and translate them into electrical vibrations, electric filters eliminating certain undesirable frequencies among the electrical vibrations means for producing a voltage varying substantially as $$K_1 \frac{d^k}{dt^k} f(t) + K_2 \frac{d^{k+s}}{dt^{k+s}} f(t)$$

where the function $f(t)$ represents the output of the filters, the symbol $d^n/dt^n$ denotes differentiation of the order $n$, the symbol $d^{-n}/dt^{-n}$ denotes integration of the order $m$, $k$ is a positive or negative integer, $s$ is an even integer, $K_1$ and $K_2$ are properly chosen constants, recording the said voltage.

44. The method of increasing the determinacy of the reflection points in a record of the earth vibrations which consists in producing effects representing derivatives of the earth vibrations, combining and recording the effects and observing the record of the combination of the derivatives for the points of reflection.

45. In combination with a geophone a filter, a derivator, means for squaring the output of the derivator, means for squaring the output of the geophone, means for producing the sum of the said squared outputs, means for recording the sum.

46. In combination with a geophone, a filter, an integrator, means for squaring the output of the integrator, means for squaring the output of the geophone, means for producing the sum of the said squared outputs, means for producing the record of the sum.

47. In combination with a geophone, a filter, an integrator, a derivator, means for combining the output of the integrator and of the derivator, means for recording the combined output.

48. In combination with a geophone, a filter, an integrator, a derivator, means for adding the output of the integrator and of the derivator, means for recording the added output.

49. The method of seismic surveying which comprises creating a disturbance in the earth, and recording the rate of change of the energy derived from the disturbance.

50. The method of seismic surveying which comprises creating a disturbance in the earth, recording the rate of change of the energy derived from the disturbance and observing the record for the points of reflection.

51. The method of seismic surveying which comprises creating a disturbance below the earth's surface, receiving the several waves thus formed, translating these waves into electric vibrations, producing a voltage varying substantially according to a formula $$\frac{d}{dt}\left\{K_1[f(t)]^2 + K_2\left[\frac{df(t)}{dt}\right]^2\right\}$$

where $f(t)$ expresses the said electrical vibrations, $K_1$ and $K_2$ are properly chosen constants, recording this voltage.

52. The method of seismic surveying which comprises creating a disturbance below the earth's surface, receiving the several waves thus formed, translating these waves into electric vibrations, producing a voltage varying substantially according to a formula $$\frac{d}{dt}\left\{K_1[f(t)]^2 + K_2\left[\int_0^t f(t)dt\right]^2\right\}$$

where $f(t)$ expresses the said electrical vibrations, $K_1$ and $K_2$ are properly chosen constants, recording this voltage.

53. The method of seismic surveying which comprises creating a disturbance below the earth's surface, receiving the several waves thus formed, translating these waves into electrical vibrations, filtering certain undesirable frequencies among the electrical vibrations, producing a voltage varying substantially according to a formula $$\frac{d}{dt}\left\{K_1[f(t)]^2 + K_2\left[\frac{df(t)}{dt}\right]^2\right\}$$

where $f(t)$ expresses the electrical vibrations from which the undesirable frequencies have been eliminated, $K_1$ and $K_2$ are properly chosen constants, recording this voltage.

54. The method of seismic surveying which comprises creating a disturbance below the earth's surface, receiving the several waves thus formed, translating these waves into electrical vibrations, filtering certain undesirable frequencies among the electrical vibrations, producing a voltage varying substantially according to a formula $$\frac{d}{dt}\left\{K_1[f(t)]^2 + K_2\left[\int_0^t f(t)dt\right]^2\right\}$$

where $f(t)$ expresses the electrical vibrations from which the undesirable frequencies have been eliminated, $K_1$ and $K_2$ are properly chosen constants, recording this voltage.

55. In a system for geological surveying, means for creating a disturbance in the earth, means for translating the waves thus produced into electrical vibrations, means for producing a voltage varying substantially as $$\frac{d}{dt}\left\{K_1[f(t)]^2 + K_2\left[\frac{df(t)}{dt}\right]^2\right\}$$

where $f(t)$ represents the electrical vibrations, $K_1$ and $K_2$ are properly chosen constants, means for recording this voltage.

56. In a system for geological surveying, means for creating a disturbance in the earth, means for translating the waves thus produced into electrical vibrations, means for producing a voltage varying substantially as $$\frac{d}{dt}\left\{K_1[f(t)]^2 + K_2\left[\int_0^t f(t)dt\right]^2\right\}$$

where $f(t)$ represents the electrical vibrations, $K_1$ and $K_2$ are properly chosen constants, means for recording this voltage.

57. In a system for geological surveying, means for creating a disturbance in the earth, a plurality of geophones conveniently placed at the earth's surface, which receive the waves resulting from the said disturbance and translate them into electrical vibrations, filters eliminating certain undesirable frequencies among the electrical vibrations, and delivering a voltage varying with time $t$ as a function $f(t)$, means for producing a voltage varying substantially as $$\frac{d}{dt}\left\{K_1[f(t)]^2 + K_2\left[\frac{df(t)}{dt}\right]^2\right\}$$

where $K_1$ and $K_2$ are properly chosen constants, means for recording this voltage.

58. In a system for geological surveying, means for creating a disturbance in the earth, a plurality of geophones conveniently placed at the earth's surface, which receive the waves resulting from the said disturbance and translate them into electrical vibrations, filters eliminating certain undesirable frequencies among the electrical vibrations, means for producing a voltage varying substantially as $$\frac{d}{dt}\left\{K_1[f(t)]^2+K_2\left[\int_0^t f(t)dt\right]^2\right\}$$

where $f(t)$ is the voltage output of the filter, $K_1$ and $K_2$ are properly chosen constants, means for recording this voltage.

59. The method of seismic surveying which comprises creating a disturbance below the earth's surface, receiving the several waves thus formed, translating these waves into electrical vibrations, producing a voltage varying substantially according to a formula $$\frac{d}{dt}\left\{K_1\left[\frac{d^k}{dt^k}f(t)\right]^2+K_2\left[\frac{d^{k+r}}{dt^{k+r}}f(t)\right]^2\right\}$$

where $f(t)$ expresses the said electrical vibrations, the symbol $d^n/dt^n$ denotes differentiation of the order $n$, the symbol $d^{-m}/dt^{-m}$ denotes integration of the order $m$, $k$ is a positive or negative integer, $r$ is an odd integer, $K_1$ and $K_2$ are properly chosen constants, recording this voltage.

60. The method of seismic surveying which comprises creating a disturbance below the earth's surface, receiving the several waves thus formed, translating these waves into electrical vibrations, filtering certain undesirable frequencies among the electrical vibrations, producing a voltage varying substantially according to a formula $$\frac{d}{dt}\left\{K_1\left[\frac{d^k}{dt^k}f(t)\right]^2+K_2\left[\frac{d^{k+r}}{dt^{k+r}}f(t)\right]^2\right\}$$

where $f(t)$ expresses the electrical vibrations from which the undesirable frequencies have been eliminated, the symbol $d^n/dt^n$ denotes differentiation of the order $n$, the symbol $d^{-m}/dt^{-m}$ denotes integration of the order $m$, $k$ is a positive or negative integer, $r$ is an odd integer, $K_1$ and $K_2$ are properly chosen constants, recording this voltage.

61. In a system for geological surveying means for creating a disturbance in the earth, means for translating the waves thus produced into electrical vibrations, means for producing a voltage varying substantially as $$\frac{d}{dt}\left\{K_1\left[\frac{d^k}{dt^k}f(t)\right]^2+K_2\left[\frac{d^{k+r}}{dt^{k+r}}f(t)\right]^2\right\}$$

where $f(t)$ expresses the said electrical vibrations, the symbol $d^n/dt^n$ denotes differentiation of the order $n$, the symbol $d^{-m}/dt^{-m}$ denotes integration of the order $m$, $k$ is a positive or negative integer, $r$ an odd integer, $K_1$ and $K_2$ are properly chosen constants, recording this voltage.

62. In a system for geological surveying, means for creating a disturbance in the earth, a plurality of geophones conveniently placed at the earth's surface, which receive the waves resulting from the said disturbance and translate them into electrical vibrations, filters eliminating certain undesirable frequencies among the electrical vibrations, means for producing a voltage varying substantially as $$\frac{d}{dt}\left\{K_1\left[\frac{d^k}{dt^k}f(t)\right]^2+K_2\left[\frac{d^{k+r}}{dt^{k+r}}f(t)\right]^2\right\}$$

where $f(t)$ is the voltage output of the filters, the symbol $d^n/dt^n$ denotes differentiation of the order $n$, the symbol $d^{-m}/dt^{-m}$ denotes integration of the order $m$, $k$ is a positive or negative integer, $r$ is an odd integer, $K_1$ and $K_2$ are properly chosen constants, recording this voltage.

63. In combination with a geophone a filter, a derivator, means for squaring the output of the derivator, means for squaring the output of the geophone, means for producing the sum of the said squared outputs, means for producing the derivative of the sum, means for recording the derivative.

64. In a combination with a geophone, a filter, an integrator, a derivator, means for combining the output of the integrator and of the derivator, means for producing a derivative of the combined output, means for recording the derivative.

SERGE A. SCHERBATSKOY.
    JACOB NEUFELD.